United States Patent [19]

Ono et al.

[11] Patent Number: 4,742,137
[45] Date of Patent: May 3, 1988

[54] POLYMER PARTICLES AND PROCESS FOR PRODUCING THE SAME

[75] Inventors: Hisao Ono; Nobuyuki Ito, both of Yokkaichi; Kiyoshi Kasai, Yokkaishi; Nobuo Sakurai, Aichi; Eitaro Okuya, Mie, all of Japan

[73] Assignee: Japan Synthetic Rubber Co., Ltd., Tokyo, Japan

[21] Appl. No.: 906,192

[22] Filed: Sep. 11, 1986

Related U.S. Application Data

[62] Division of Ser. No. 747,304, Jun. 21, 1985, abandoned.

[30] Foreign Application Priority Data

| Jul. 11, 1984 | [JP] | Japan | 59-142221 |
| Jul. 11, 1984 | [JP] | Japan | 59-142222 |
| Aug. 3, 1984 | [JP] | Japan | 59-162873 |
| Dec. 25, 1984 | [JP] | Japan | 59-271888 |
| Feb. 21, 1985 | [JP] | Japan | 60-31530 |

[51] Int. Cl.$^4$ .................. C08F 2/22; C08F 2/16; C08F 36/06; C08F 36/00
[52] U.S. Cl. ........................ 526/92; 526/93; 526/94; 526/335
[58] Field of Search ............ 526/92, 93, 94, 335

[56] References Cited

U.S. PATENT DOCUMENTS

| 4,153,767 | 5/1979 | Ueno | 526/141 |
| 4,429,085 | 1/1984 | Henderson | 526/92 |
| 4,463,146 | 7/1984 | Donbar | 526/142 |
| 4,501,867 | 2/1985 | Ueno | 526/136 |

*Primary Examiner*—Paul R. Michl
*Assistant Examiner*—Mark R. Buscher
*Attorney, Agent, or Firm*—Oblon, Fisher, Spivak, McClelland & Maier

[57] ABSTRACT

An aqueous dispersion of polymer particles each consisting essentially of (a) a syndiotactic 1,2-polybutadiene having 70% or more of unsaturated hydrocarbon groups in the side chains and having a melting point of 70° C. or higher, (b) a polymer mixture of said polybutadiene (a) and other polymer in the form that (a) and (b) co-exist in the same particle, or (c) a copolymer obtained by graft-polymerizing a conjugated diene and/or other polymerizable monomer on said polybutadiene (a), each of said particles having an average diameter of 10 $\mu$m or less. Said aqueous dispersion can be produced by a process comprising steps of adding, to an aqueous dispersion of a first catalyst component solution, a conjugated diene monomer and a second catalyst component and polymerizing said conjugated diene monomer, characterized in that the first catalyst component solution contains (A) a cobalt compound, (B) at least one member selected from the group consisting of alkali metals, organometallic compounds of metals of Groups I to III of the Periodic Table and hydrides of metals of Groups I to III of the Periodic Table, and (C) 1 to 1,000 moles, per mole of the cobalt compound (A), of a conjugated diene compound and then the second catalyst component is at least one compound selected from the group consisting of carbon disulfide, phenylisothiocyanic acid and a xanthogen compound.

24 Claims, No Drawings

POLYMER PARTICLES AND PROCESS FOR PRODUCING THE SAME

This is a division of application Ser. No. 747,304, filed June 21, 1985, now abandoned.

This invention relates to polymer particles consisting essentially of a crystalline polymer obtained from polymerization of a conjugated diene monomer which polymer contains a high proportion of unsaturated hydrocarbon groups in the side chains, and to a process for producing said polymer particles.

1,2-Polybutadiene (hereinafter abbreviated to 1,2PBD), which is a crystalline polymer containing a high proportion of vinyl groups in the side chains, is characterized by having a high melting point, excellent mechanical properties, excellent solvent resistance and the like. Accordingly, this polymer is widely used in fields such as, for example, adhesives [Japanese Patent Unexamined Publication No. 79,169/81], coating agents [Japanese Patent Unexamined Publication No. 98,160/81], asphalt compositions [Japanese Patent Unexamined Publication No. 135,114/75], hot melt adhesives [Japanese Patent Unexamined Publication Nos. 13,674/75 and 89,934/81], photosensitive resins for flexographic printing plate [Japanese Patent Unexamined Publication Nos. 12,004/77 and 64,301/77], backing materials for carpet [Japanese Patent Unexamined Publication No. 72,683/76] and foamed materials [Japanese Patent Unexamined Publication Nos. 73,071/80 and 43,870/77].

Synthesis of such a crystalline polymer generally requires organometallic compounds as a catalyst and hence is difficult to conduct in an aqueous system. Therefore, the synthesis need usually be conducted by solution polymerization. This causes, however, the following various problems:

(1) The viscosity of the reaction mixture increases with the progress of polymerization reaction, and therefore, the stirring and temperature control of the reaction mixture become insufficient and a crystalline polymer having the desired characteristics is difficult to obtain.

(2) The crystalline polymer is produced in a solution state. Therefore, the isolation of the polymer is not easy and solvent recovery becomes necessary. Hence, the operation is complicated and the working efficiency is inferior.

(3) When the crystalline polymer produced is utilized in a solution state, not only is it necessary to ensure the safety against oder, toxicity, flammability, etc. of the organic solvent used, but also the organic solvent must finally be removed and recovered. Thus, the range of uses is limited.

In order to solve the above problems and to allow said crystalline polymer to be used in various applications while ensuring a high working efficiency and a high safety, it is greatly advantageous to use said polymer in the form of an aqueous dispersion or aqueous emulsion (hereinafter referred to simply as "aqueous dispersion") wherein water is used as a dispersing medium. This aqueous dispersion of a crystalline polymer produced by solution polymerization can be obtained by dissolving the crystalline polymer in a solvent and emulsifying and dispersing the resulting solution in water in the presence of an emulsifier. However, the aqueous dispersion thus obtained has the following drawbacks and does not always possess a sufficient utilizability in industry:

(1) Since the crystalline polymer has a high crystallinity and a relatively high melting point, the solvent used for dissolving the polymer is greatly restricted. Moreover, for complete dissolution of the polymer, a high temperature and a high pressure are required, and hence, the production thereof is not easy.

(2) It is difficult to make small and uniform the diameters of the droplets of the polymer solution which is the dispersed phase of the aqueous dispersion. Accordingly, the aqueous dispersion is inferior in dispersion stability and it is difficult to keep the dispersion in a stable state over a long period of time.

(3) For thorough emulsification and dispersion, a large amount of an emulsifier is required. This reduces the water resistance of the polymer.

This invention has been made in the above background, and the object of this invention is to provide (1) polymer particles consisting essentially of a crystalline polymer containing a high proportion of unsaturated hydrocarbon groups in the side chains, which particles are uniform, excellent in dispersion stability and usable in various applications, (2) polymer particles that the crystalline polymer of (1) and other polymer co-exist in the same particle, and (3) a process for easily producing an aqueous dispersion of such polymer particles with a high efficiency.

According to this invention, there are provided polymer particles each consisting essentially of a syndiotactic 1,2-PBD having 70% or more of unsaturated hydrocarbon groups in the side chains and having a melting point of 70° C. or more, or of a polymer mixture of said syndiotactic 1,2-PBD and a polymer different therefrom which co-exist in the same particle, or of a graft copolymer of a conjugated diene monomer and/or other polymerizable monomer on said syndiotactic 1,2-PBD, each of said particles having an average diameter of 10 μm or less.

This invention further provides a process for producing polymer particles comprising steps of adding, to an aqueous dispersion of a first catalyst component solution, a conjugated diene monomer and a second catalyst component in the presence or absence of seed polymer particles, and polymerizing said conjugated diene monomer, characterized in that the first catalyst component solution contains (A) a cobalt compound, (B) at least one member selected from the group consisting of alkali metals, organometallic compounds of metals of Groups I to III of the Periodic Table, and hydrides of metals of Groups I to III of the Periodic Table and (C) 1 to 1,000 moles, per mole of the cobalt compound (A), of a conjugated diene monomer and is in the form of droplets having an average diameter of 10 μm or less, and that the second catalyst component is at least one compound selected from the group consisting of carbon disulfide, phenylisothiocyanic acid and a xanthogen compound. The above process for producing polymer particles according to this invention includes the following specific processes.

Process (A): In the above production process, the conjugated diene monomer is polymerized in the absence of seed polymer particles, to produce polymer particles.

Process (B): In the Process (A), the aqueous dispersion of a first catalyst component solution is replaced by an aqueous dispersion of seed polymer particles having absorbed therein the first catalyst component solution, and the polymerization is effected to produce polymer particles.

Process (C): A process for producing an aqueous dispersion of graft polymer particles, comprising a first step consisting of the above Process (A) or (B) for producing polymer particles and a subsequent second step consisting of adding a polymerizable monomer to the resulting aqueous dispersion of polymer particles and graft-polymerizing the monomer on the polymer particles.

The polymer particles of this invention are produced by polymerizing a conjugated diene monomer and each particle consists essentially of a crystalline polymer having 70% or more of unsaturated hydrocarbon groups in the side chains or a mixture of said polymer and other polymer different therefrom in the form that the two co-exist in the same particle and has an average diameter of 10 μm or less. Said crystalline polymer usually has a melting point of 70° C. or more.

This invention will be explained in detail below.

First of all, the production process of this invention will be described referring to Process (A).

In Process (A) of this invention, the particularly characteristic feature lies in that the catalyst used is composed of a first catalyst component solution and a second catalyst component (both of which are described in detail later), and only when the two catalyst components are combined a catalytic activity is exhibited, and each of these catalyst components is added to a reaction system dispersion stepwise in the following Step (I) or Step (II) to effect polymerization.

Step (I): A first catalyst component solution is dispersed in water in the presence of an emulsifier to form an emulsion, whereby said first catalyst component solution is formed into fine droplets having diameters of 10 μm or less.

Step (II): To the system obtained in Step (I) are added a conjugated diene monomer and a second catalyst component and the monomer is polymerized.

The first catalyst component solution can be obtained by contacting (A) a cobalt compound with (B) an alkali metal or an organometallic compound or a hydride of a metal of Groups I to III of the Periodic Table in the presence of (C) 1 to 1,000 moles, per mole of the cobalt compound (A), of a conjugated diene monomer.

The second catalyst component consists of at least one compound (D) selected from the group consisting of carbon disulfide, phenylisothiocyanic acid and a xanthogen compound.

The cobalt compound (A) used for the preparation of the first catalyst component solution includes organic acid salts such as cobalt octylate, cobalt naphthenate, cobalt benzoate, cobalt succinate, cobalt malonate, cobalt acetate and the like; cobalt complexes such as cobalt bisacetylacetonate, cobalt trisacetylacetonate, cobalt ethylacetoacetate and the like; triarylphosphine complexes of cobalt halides such as triphenylphosphine complex of cobalt bromide, tri-m-tolylphosphine complex of cobalt bromide, tri-m-xylylphosphine complex of cobalt bromide and the like; pyridine derivative complexes of cobalt halides such as pyridine complex of cobalt chloride, β-picoline complex of cobalt chloride and the like; and mono- or nonvalent cobalt complexes such as ethyl alcohol complex of cobalt chloride, (1,3-butadiene)[1-(2-methyl-3-butenyl)-π-allyl]cobalt, tris-π-allylcobalt, bicyclo-[3,3,0]-octyldienyl-1,5-cyclooctadienecobalt, bis-(π-allyl)-halogenocobalt (the halogen is I, Br or Cl), octacarbonyldicobalt and the like. These cobalt compounds can be used alone or in admixture of two or more.

As the alkali metal of the component (B) used for the preparation of the first catalyst component solution, there can be used lithium, sodium, potassium, rubidium, cesium, etc. Of these, lithium and sodium are particularly preferred.

As the organometallic compound or hydride of a metal of Groups I to III of the Periodic Table, compounds capable of reducing cobalt are used preferably. The metals of Groups I to III of the Periodic Table are the metals of Groups Ia, Ib, IIa, IIb, IIIa and IIIb, among which the metals of Groups Ia, IIa and IIIa are preferred. Preferable metals are Li, Na, K, Mg, Zn and Al. Particularly preferred are Li and Al, among which preferable organometallic compounds and hydrides of these metals are $C_{1-6}$alkylated products and hydrides of the metals. They are specifically $C_{1-6}$alkyllithium compounds such as ethyllithium, n-butyllithium, sec-butyllithium and the like; $C_{1-6}$alkylzinc compounds such as diethylzinc, dimethylzinc and the like; $C_{1-6}$alkylmagnesium compounds such as butylmagnesium chloride, ethylmagnesium bromide, dibutylmagnesium, dihexylmagnesium and the like; $C_{1-6}$alkylaluminum compounds such as trimethylaluminum, triethylaluminum, triisobutylaluminum, tri-n-hexylaluminum, tridodecylaluminum, diethylaluminum chloride, diisobutylaluminum chloride, ethylaluminum sesquichloride, ethylaluminum dichloride, tetraethylaluminoxane and the like; and metal hydrides such as lithium aluminum hydride, sodium boron hydride, lithium boron hydride and the like. These metal compounds can be used alone or in admixture of two or more.

The conjugated diene monomer (C) is a conjugated diene having 4 to 5 carbon atoms such as butadiene, isoprene or the like. 1,3-Butadiene is particularly preferred.

The method of preparing the first catalyst component solution is very important. In this preparation, it is necessary that (A) a cobalt compound and (B) an alkali metal or an organometallic compound or hydride of a metal of Groups I to III of the Periodic Table be first contacted and reacted with each other in the presence of (C) a conjugated diene compound. At this time, the amount of (C) the conjugated diene compound used is preferably 1 to 1,000 moles, more preferably 6 to 300 moles, per mole of (A) the cobalt compound. The amount of (B) the alkali metal or the organometallic compound or hydride of a metal of Groups I to III of the Periodic Table is preferably 0.3 to 100 moles, more preferably 0.9 to 50 moles, per mole of (A) the cobalt compound The temperature used in the preparation of the first catalyst component solution is preferably −78° to 100° C., more preferably −30° to 50° C. The reaction between (A) the cobalt compound and (B) the alkali metal or the organometallic compound or hydride of a metal of Groups I to III of the Periodic Table can be conducted uniformly by stirring the catalyst components together with a solvent, if necessary. Solvents which have a solubility in water of not more than $10^{-3}\%$ by weight, easily absorb the conjugated diene monomer added in Step (II) and act as auxiliary absorbents are preferred in the respect that the emulsified droplets having a small diameter are stably present for a long period of time. Such solvents include n-hexane, n-heptane, n-pentane, refined kerosene and the like. When this solvent is used in combination with a solvent having a solubility in water of more than $10^{-3}\%$ by weight, such as toluene, xylene, cyclohexane or the like, the amount of the former solvent used should be preferably 0.5% by weight or more, particularly preferably 2% by weight or more, based on the weight of the first catalyst component solution. The amount of the solvent having a solubility in water of more than $10^{-3}\%$ by weight added is preferably 99.5% by weight or less, more preferably 98% by weight or less, based on the first catalyst component solution. However, the less the better.

With respect to the use of (D) at last one of the carbon disulfide, phenylisothiocyanic acid and xyanthogen compound as the second catalyst component, there is no critical condition. However, it is preferred that they are subjected, prior to the use, to nitrogen gas bubbling, etc. for the preliminary removal of oxygen dissolved therein.

The xanthogen compound is a compound having a group represented by the general formula:

$$R-O-\overset{\overset{S}{\|}}{C}-S-$$

wherein R is an alkyl grup. Specific examples of the compound are xanthogenic acids such as methylxanthogenic acid, ethylxanthogenic acid, n-propylxanthogenic acid, isopropylxanthogenic acid, n-butylxanthogenic acid, sec-butylxanthogenic acid, t-butylxanthogenic acid, n-pentylxanthogenic acid, n-hexylxanthogenic acid, n-heptylxanthogenic acid, n-octylxanthogenic acid, 2-ethylhexylxanthogenic acid, phenylxanthogenic acid, p-tolylxanthogenic acid and the like; lithium, sodium and potassium salts of these xanthogenic acids; and xanthogen disulfides such as dimethylxanthogen disulfide, diethylxanthogen disulfide, di-n-propylxanthogen disulfide, diisopropylxanthogen disulfide, di-n-butylxanthogen disulfide, di-t-butylxanthogen disulfide, 2-ethylhexylxanthogen disulfide, diphenylxanthogen disulfide, ethylphenylxanthogen disulfide and the like. Of these, xanthogen disulfides are preferred, and dimethylxanthogen disulfide, diisopropylxanthogen disulfide and diphenylxanthogen disulfide are more preferable.

The amount of the second catalyst component used is preferably 0.01 to 100 moles, more preferably 0.3 to 10 moles, per mole of the cobalt compound (A) of the first catalyst component solution.

The conjugated diene monomer used in Step (II) is preferably a conjugated diene having 4 to 5 carbon atoms, such as butadiene, isoprene or the like and is particularly preferably 1,3-butadiene. A small amount of an olefin, etc. can co-exist with the conjugated diene monomer in the reaction system. The conjugated diene monomer may be used, if necessary, in the form of a solution in an organic solvent. The organic solvent includes aromatic hydrocarbons such as benzene, toluene, xylene and the like; aliphatic hydrocarbons such as pentane, hexane, heptane, octane and the like; halogenated hydrocarbons such as methylene chloride, ethylene dichloride, trichloroethane, chlorobenzene and the like; ester type solvents such as ethyl acetate, propyl acetate, butyl acetate, ethyl octylate, $\epsilon$-caprolactone, $\gamma$-valerolactone and the like; alcohol type solvents such as methanol, ethanol, isopropanol, n-butanol, sec-butanol, octanol, ethylene glycol and the like; ketone type solvents such as acetone, methyl ethyl ketone, acetophenone, acetylacetone and the like; nitrile type solvents such as acetonitrile, adiponitrile, benzonitrile and the like; and amide type solvents such as $\epsilon$-caprolactam, propiolactam, butyrolactam, valerolactam, N-methylpyrrolidone, N-ethylpyrrolidone, N-methylformamide, N-ethylformamide, N,N-dimethylformamide and the like.

These organic solvents may be used also as a solvent for the second catalyst component.

Process (A) of this invention will be explained in more detail.

In Step (I), a dispersing medium (water), an emulsifier and the above-mentioned first catalyst component solution are stirred to form an emulsion in which fine droplets of the first catalyst component solution are dispersed in water.

The size of these droplets largely affects the diameters of the polymer particles constituting the dispersed phase of an aqueous dispersion to be obtained ultimately, and the diameters of the polymer particles can be controlled by adjusting the size of the droplets of the first catalyst component solution. That is, the diameter of the polymer particles is expressed by the following equation:

$$D = d \times \left( \frac{V_1 + V_2}{V_1} \right)^{\frac{1}{3}}$$

wherein D is the diameter of the polymer particles, d is the diameter of the droplets of the first catalyst component solution, $V_1$ is the total volume of the first catalyst component solution and $V_2$ is the total volume of a conjugated diene monomer to be added in Step (II). The size of the droplet diameter d of the first catalyst component solution is preferably 10 $\mu$m or less, more preferably 5 $\mu$m or less, most preferably 1 $\mu$m or less. In order to obtain a dispersion of such fine droplets, it is necessary to apply a large shear force to the dispersion by means of, for example, an ultrasonic wave or a Manton Gaulin homogenizer in which shearing is effected under a high pressure. In an operation for obtaining a dispersion of these fine droplets, cooling of the system is required for avoidance of heat generation and the presence of an inert atmosphere such as nitrogen gas or the like is also required for prevention of oxygen from being incorporated.

The emulsifier used in Step (I) may be any emulsifier as long as it can disperse the droplets of the first catalyst component solution. Conventional emulsifiers may be used such as, for example, anionic emulsifiers (e.g. sodium dodecylbenzenesulfonate, sodium laurylsulfate, sodium dialkylsulfosuccinate, a naphthalenesulfonic acid-formalin condensate, a resin soap, fatty soap). Together with these emulsifiers, there may be used nonionic surfactants such as a polyoxyethylene nonylphenyl ether, a polyethylene glycol monostearate, sorbitan monostearate and the like.

In subsequent Step (II), a conjugated diene monomer is added to the system obtained in Step (I) and they are stirred, whereby the conjugated diene monomer is absorbed in the fine droplets of the first catalyst component solution dispersed in said system. In this case, the conjugated diene monomer may be added, if necessary, in the form of an emulsion obtained by adding thereto water and an emulsifier. Subsequently, a second catalyst component is added and a polymerization reaction is conducted at a temperature of $-5°$ to $80°$ C., preferably $0°$ to $50°$ C.

Water as a dispersing medium as well as water required during polymerization is preferably be freed, prior to their use, of oxygen dissolved therein by means of nitrogen bubbling or by the use of a water-soluble oxygen removing agent such as sodium dithionite or the like.

The polymer particles obtained by Process (A) consist essentially of a crystalline polymer produced by the polymerization of a conjugated diene monomer, which polymer has 70% or more of unsaturated hydrocarbon groups in the side chains and has a melting point of 70° C. or more, and have an average diameter of 10 μm or less, preferably 5 μm or less, more preferably 2 μm or less, particularly preferable 1 μm or less.

In Process (B) of this invention, to an aqueous dispersion of seed polymer particles are added a diene monomer and the above-mentioned aqueous dispersion of a first catalyst component solution, and then, a solution of a second catalyst component is added. That is, the catalyst components are stepwise added to a reaction system dispersion in Step (I) and Step (II) as described below and polymerization is carried out.

Step (I): An aqueous dispersion of fine seed polymer particles containing a conjugated diene monomer is mixed with an aqueous dispersion of a first catalyst component solution to allow the fine seed polymer particles to absorb the first catalyst component solution. Alternatively, an aqueous dispersion of fine seed polymer particles is mixed with an aqueous dispersion of fine first catalyst component solution droplets to allow the fine seed polymer particles to absorb the first catalyst component solution and then a conjugated diene monomer is added. Thus, an aqueous dispersion of fine seed polymer particles having absorbed therein a first catalyst component solution and a conjugated diene monomer can be prepared.

Step (II): To the system obtained in Step (I) is added a second catalyst component and subsequently polymerization is effected.

Process (B) will be explained in more detail below.

When the aqueous dispersion of fine seed polymer particles used in Step (I) contains a conjugated diene monomer this aqueous dispersion can be prepared by the following methods, for example:

In the first method of preparing the aqueous dispersion, to an aqueous dispersion (emulsion or suspension) in which the dispersed phase is seed polymer particles is added a conjugated diene monomer in an amount of 10,000 parts by weight or less, preferably 1,000 parts by weight or less, particularly preferably 200 parts by weight, or less, per 100 parts by weight of said seed polymer particles and they are stirred. In this case, the conjugated diene monomer may be added, if necessary, in the form of an aqueous emulsion produced by adding thereto water and an emulsifier. When the amount of the conjugated diene monomer added is too large as compared with the amount of the seed polymer particles, the amount of the conjugated diene monomer remaining in the dispersing medium without being absorbed in the seed polymer particles becomes large and, consequently, unexpected new polymer particles come to be formed. This is undesirable.

The aqueous dispersion of fine seed polymer particles used in Step (I) is not critical. As the aqueous dispersion, there can be used, for example, an emulsion of particles of 0.05 to 6 μm in diameter produced by an emulsion polymerization, or a suspension of particles of 1 to 100 μm in diameter produced by a suspension polymerization. As the polymer constituting such particles, there can be used a polystyrene, a polybutadiene, a styrenebutadiene copolymer, an acrylonitrile-butadiene copolymer, an acrylic ester copolymer, a methacrylic ester copolymer, a polyisoprene, a butadiene-isoprene copolymer, a polychloroprene, or the like. As the aqueous dispersion mentioned above, there can also be used known dispersions obtained by redispersing a polymer produced by a solution polymerization or other polymerization, in water with an emulsifier, such as a cis-1,4-polyisoprene dispersion and the like, as well as natural rubber latexes and their concentrates.

When the above seed polymer is subjected to the so-called carboxy-modification namely introduction of a carboxyl group onto the surface of the polymer, or a polymerization initiator of persulfate type is used in the production of the seed polymer, the dispersion stability of the seed polymer is improved, and as a result, the amount of an emulsifier used can be relatively reduced and the mechanical and chemical stabilities of the seed polymer can be enhanced.

In the second method of preparing the aqueous dispersion, an emulsion containing a conjugated diene monomer is prepared and emulsion polymerization is effected. When the conversion is 99% or less, preferably 90% or less, a polymerization terminator is added to terminate the polymerization. As the polymerization terminator, any terminator may be used unless it deactivates the first and second catalyst components used in Step (I) and Step (II). Specific examples of the polymerirzation terminator are amine compounds such as N,N-diethylhydroxylamine, tetraethylenepentamine and the like; phenol compounds such as p-t-butylcatechol, di-t-amylhydroquinone, α-nitroso-β-naphthol and the like; hydrazine compounds such as phenylhydrazine and the like; sodium nitrite; etc.

As the conjugated diene monomer to be contained in the seed polymer particles in the aqueous dispersion, those having 4 to 5 carbon atoms may be used such as butadiene, isoprene and the like, and 1,3-butadiene is particularly preferable. The conjugated diene monomer can be used, if necessary, in the form of a solution in an organic solvent. The organic solvent includes aromatic hydrocarbons such as benzene, toluene, xylene and the like; aliphatic hydrocarbons such as pentane, hexane, heptane, octane and the like; halogenated hydrocarbons such as methylene chloride, ethylene dichloride, trichloroethane, chlorobenzene and the like; ester type solvents such as ethyl acetate, propyl acetate, butyl acetate, ethyl octylate, ε-caproacetone, γ-valerolactone and the like; alcohol type solvents such as methanol, ethanol, isopropanol, n-butanol, sec-butanol, octanol, ethylene glycol and the like; ketone type solvents such as acetone, methyl ether ketone, acetophenone and the like; nitrile type solvents such as acetonitrile, adiponitrile, benzonitrile and the like; and amide type solvents such as ε-caprolactam, propiolactam, butyrolactam, valerolactam, N-methylpyrrolidone, N-ethylpyrrolidone, N-methylformamide, N-ethylformamide, N,N-(dimethylformamide and the like.

Process (B) will be described more specifically.

First of all, in Step (I), an aqueous dispersion of seed polymer particles containing or not containing a conjugated diene monomer, obtained by the above-mentioned method is mixed with an aqueous dispersion of a first catalyst component solution, and the resulting mixture is stirred to allow the seed polymer particles to absorb the first catalyst component solution.

In order to allow the seed polymer particles containing or not containing a conjugated diene monomer to effectively absorb the first catalyst component solution, it is preferred that the first catalyst component solution be preliminarily dispersed in water in the presence of an emulsifier so that the particle diameters are the same as or smaller than those of the seed polymer particles to form an emulsion.

In order to accelerate the absorption of the first catalyst component solution in the seed polymer particles, the aqueous dispersion used in Step (I) may contain as a swelling agent a compound having a high water solubility and capable of acting as a solvent for the first catalyst component solution, such as acetone, a lower alkanol, methyl acetate, acetonitrile or the like. This compound can be used in a proportion of 1 to 100% by weight based on the weight of water; however, in order to keep the dispersion state of the seed polymer particles good, the compound is desired to be used in a proportion of 10% by weight or less, preferably 5% by weight or less.

In Step (I), when the first catalyst component solution is absorbed in the seed polymer particles not containing a conjugated diene monomer and the conjugated diene monomer is thereafter absorbed, the latter absorption can be conducted easily by adding the conjugated diene monomer to the aqueous dispersion of the seed polymer particles and stirring the resulting mixture, or by adding, if necessary, water and an emulsifier to a conjugated diene monomer to form an emulsion and then adding this emulsion to the aqueous dispersion of seed polymer particles.

In the subsequent Step (II), a second catalyst component is added to the system obtained in Step (I) and polymerization is effected at a temperature of $-5°$ to $80°$ C., preferably $0°$ to $50°$ C. In this polymerization, no special termination treatment is required and this polymerization may be allowed to proceed to a polymerization conversion of almost 100%. However, the conversion may be controlled by adding to the system a polymerization terminator, for example, a thiocarbamate compound such as a potassium, sodium or ammonium salt of dimethyldithiocarbamic acid or the like; or a thiuram disulfide compound such as tetramethylthiuram disulfide or the like.

The polymer particles obtained in Process (B) are complex polymer particles, in which the polymer constituting the seed polymer particles used in Step (I) and the crystalline polymer formed by polymerization of the conjugated diene monomer contained in the seed polymer particles co-exist in one and the same particle.

This crystalline polymer constituting the polymer particles is a highly crystalline polymer having 70% or more of unsaturated hydrocarbon groups in the side chains.

Process (C) is a process for producing an aqueous dispersion of graft polymer particles comprising a first step consisting of Process (A) or (B) for producing polymer particles and a subsequent second step of adding a polymerizable monomer to an aqueous dispersion of said polymer particles and then graft-polymerizing the monomer on the conjugated diene polymer dispersed in said aqueous dispersion.

Polymers produced by a polymerization using a transition metal as a catalyst have the characteristic feature that the regurality in their microstructures is very high, and accordingly, they are usueful in various applications. However, the synthesis of these polymers has the problem that the oxygen or water present in the reaction system deactivates the catalyst used, and therefore, it cannot be effected in an aqueous system and finally must be carried out by a solution polymerization.

In order to produce a graft copolymer using the polymer obtained by a polymerization using a transition metal, since the polymer is obtained in a solution state as mentioned above, the graft copolymerization need be conducted in a solution system. This has caused the following various problems:

(1) The viscosity of the reaction system solution increases with a progress of the polymerization reaction. This makes the stirring and temperature control of the solution insufficient, and it is difficult to obtain a graft copolymer having the desired characteristics.

(2) Of the polymer produced by a polymerization using a transition metal as a catalyst, those having a high crystallinity and a high melting point have a low solubility in solvents, and accordingly, it is impossible to keep a stable solution state. Therefore, it is substantially impossible to carry out the polymerization.

(3) The graft copolymer produced is in a solution state. This makes the isolation of the copolymer difficult, and in addition, the recovery becomes necessary. Accordingly, a complicated operation becomes necessary, the work efficiency becomes inferior and the application is limited.

According to Process (C), however, an aqueous dispersion containing as the dispersed phase a graft copolymer obtained by graft-polymerizing a polymerizable monomer on the polymer having unsaturated hydrocarbon groups in a high proportion in the side chains obtained using a transition metal as a catalyst can be produced easily with a high efficiency.

Process (C) of this invention comprises the following Step (I) and Step (II):

Step (I): A polymerization step for obtaining an aqueous dispersion of a conjugated diene polymer having 70% or more of unsaturated hydrocarbon groups in the side chains corresponding to Process (A) or (B).

Step (II): A polymerization step of reacting a conjugated diene and/or other polymerizable monomers in the aqueous dispersion of polymer obtained in Step (I) to graft the monomers on the above polymer.

Process (C) will be explained in more detail.

In process (C) of this invention, by Step (I) corresponding to Process (A) or (B) previously described in detail, an aqueous emulsion or suspension (hereinafter referred to simply as "aqueous dispersion") of a crystalline polymer having 70% or more of unsaturated hydrocarbon groups in the side chains is produced, and then, by Step (II), an aqueous dispersion of a copolymer in which a conjugated diene monomer and/or other polymerizable monomers are grafted on a trunk consisting of the above-mentioned crystalline polymer is obtained by polymerizing the above polymerizable monomers in the aqueous dispersion of polymer obtained in Step (I).

In Step (II), the aqueous dispersion obtained in Step (I) is mixed with a polymerizable monomer and a polymerization initiator and then the monomer is subjected to graft polymerization by raising the system temperature to $60°$ to $120°$ C.

When the polymer particles in the aqueous dispersion obtained in Step (I) have an average diameter of 0.01 to 10 μm, a polymerizable monomer and an oil-soluble polymerization initiator are dissolved in an inert solvent having water-solubility of $10^{-3}$% by weight or less and the resulting solution is dispersed in water by the use of a homomixer, a homogenizer or the like so that the solution has an average particle diameter of 0.05 to 3.0 μm in the resulting aqueous dispersion. In this case, the amount of the solvent used is 0.5 to 50 parts by weight, preferably 2 to 30 parts by weight, per 100 parts by weight of the polymerizable monomer. Then, this aqueous dispersion of a polymerizable monomer is mixed with the aqueous dispersion of a crystalline polymer obtained in Step (I) to allow the polymerizable monomer to be absorbed in or adsorbed on the crystalline polymer, and reaction is carried out by raising the temperature of the system.

When the polymer particles in the aqueous dispersion obtained in Step (I) have an average diameter of 0.6 μm or less, preferably 0.2 μm or less, a water-soluble polymerization initiator may be used. In this case, the polymerizable monomer is added to the reaction system at one time or in portions or continuously in the form of, for example, an emulsion produced by adding an emulsifier to the monomer.

The conjugated diene monomer added in Step (II) as the polymerizable monomer for grafting includes those having 4 to 5 carbon atoms such as butadiene, isoprene, and the like, and butadiene is most preferable.

Said other polymerizable monomers added in Step (II) include aromatic alkenyl monomers such as styrene, α-methylstyrene, p-methylstyrene and the like; vinyl esters such as vinyl acetate, vinyl propionate and the like; unsaturated nitriles such as acrylonitrile and the like; alkyl esters of ethylenically unsaturated carboxylic acids such as methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, dimethylaminoethyl methacrylate, ethylene glycol diacrylate, ethylene glycol dimethacrylate and the like.

As said other polymerizable monomers, there may also be used acrylamide, methacrylamide, glycidyl acrylate, glycidyl methacrylate, N-methylolacrylamide, N-methylolmethacrylamide, 2-hydroxyethyl acrylate, 2-hydroxyethyl methacrylate, diallyl phthalate, allyl acrylate, allyl methacrylate, etc. depending upon the purpose. Moreover, acrylic acid, methacrylic acid, itaconic acid, fumaric acid, etc. may be used, if necessary, in such an amount as not to inhibit the polymerization.

The oil-soluble polymerization initiator used for carrying out the graft copolymerization in Step (II) includes azo compounds such as azobisisobutyronitrile, azobis-2,4dimethylvaleronitrile, azobiscyclohexylnitrile, azobiscyanovaleric acid, dimethyl azobisisobutyrate, azobisaminopropane dihydrochloride and the like, and also includes organic peroxides such as octanoyl peroxide, benzoyl peroxide and the like; and persulfates, etc. The azo compound as an oil-soluble polymerization initiator can be beforehand added to the first catalyst component solution used in Step (I), together with the polymerizable monomer, and in this case, the graft copolymerization in Step (II) can be easily carried out just by raising the system temperature.

In Step (II), besides the polymerization initiator, there may be used a so-called redox catalyst which is a combination of ferrous compound or cuprous compound and a reducing agent such as vitamin C, fractose, sodium formaldehydesulfoxylate or the like, to effect the polymerization.

The polymer particles produced by Process (A) or (B) of this invention are particles of a crystalline polymer having 70% or more of vinyl groups in the side chains. When the proportion of the vinyl groups is less than 70%, the polymer has a lower crystallinity and a lower melting point and has no sufficient heat resistance (for example, it melts during drying or processing in the course of various applications). Incidentally, the proportion of vinyl groups in side chains of the above crystalline polymer refers to that obtained by measuring the infrared absorption spectrum of the polymer and analyzing the spectrum by the Morero method.

The melting point of the above crystalline polymer can be controlled in a temperature range of up to 200° C. by changing the kinds or amounts of the conjugated diene monomer used and the organic solvent used in the second catalyst component. The organic solvents having a large effect for lowering the melting point of the crystalline polymer are halogenated hydrocarbons such as carbon tetrachloride, chloroform, hexachloroethane, methylene chloride, ethylene chloride, and the like; and organic solvents having polar groups such as esters, alcohols, ketones, aldehydes, nitriles, amides, sulfoxides and the like.

When the polymer particles have a large average diameter, the aqueous dispersion of these polymer particles has a reduced stability and the polymer particles tend to precipitate, which is a problem in their practical application. The dispersion stability of the polymer particles is affected by the density of polymer particles, the viscosity of water as a dispersing medium, the concentration of solids, etc.; however, the dispersion stability can be made good by controlling the diameters of the polymer particles to 10 μm or less (this roughly corresponds to the range in which the particles can be moved by a thermal motion), preferably 5 μm or less, more preferably 2 μm or less, particularly preferably 1 μm or less.

The crystallinity of the crystalline polymer constituting the polymer particles may be varied depending upon the reaction conditions, etc., though it is usually 10% or more, preferably 30% or more, more preferably 50% or more.

In process (B), the melting point of the polymer of the polymer particles can be controlled by appropriately selecting, as a seed polymer, a polymer having a high affinity for the crystalline polymer produced in Step (II). The polymer having a high affinity for the crystalline polymer includes a polybutadiene, a butadiene-styrene copolymer, a butadiene-acrylonitrile copolymer, a cis-1,4-polyisoprene, natural rubber, etc. By considering the characteristics (e.g. melting point and the like) of these polymers and selecting the type and amount of the seed polymer to be used, the melting point of the polymer finally obtained can be controlled in a range of 200° C. or less.

The average diameter of the polymer particles can be controlled by selecting the particle diameter of the seed polymer.

In Process (B) of this invention, when the polymer constituting the seed polymer is a rubbery polymer such as a styrene-butadiene rubber, natural rubber, an ethylenepropylene rubber or a butadiene rubber; a polystyrene; or the like, the crystalline polymer is in the form of a fine fiber in the mixed polymer particles, and polymer-fiber composite particles are formed. Such polymer-fiber composite particles can be easily formed into a film by air drying, etc. and the film is highly reinforced. Therefore, the composite particles can be suitably used in various applications. When a rubbery polymer is used as the seed polymer, polymer particles are obtained wherein a fine needle-like, syndiotactic 1,2-PBD is uniformly dispersed in the rubber. By converting these polymer particles into a crumb state by coagulation or the like, there can be obtained a vulcanizable rubber composition well reinforced and excellent in resistance to breaking, fatigue resistance and extrudability.

Regarding such a rubber composition, attention has recently been paid to weight reduction of tire and other rubber products in connection with request for energy saving as well as to coloring of these products for characterization and, in this connection, various attempts have been made such as (1) reduction of the proportion of the carbon black used for reinforcement of rubber and (2) use of no carbon black but instead thereof a short fiber of a nylon, a vinylon, a glass or the like to produce a short fiber-reinforced rubber. In this short fiber-reinforced rubber, however, since the rubber and the incorporated short fiber have different moduli of elasticity, when the rubber composition receives a strain, a stress is concentrated at the ends of each fiber and the rubber begins to break at those portions. Moreover, since the bonding between the rubber and the short fiber is not sufficient, the broken portions tend to grow along the surface of the fiber, and as a result, the adhesion interface between the rubber and the short fiber are broken, resulting in large creep, and when a repeated elongation is applied, the breakage life is very short.

Hence, an attempt has been made to incorporate a 1,2-PBD short fiber of 0.2 to 10 $\mu$m in average diameter (Japanese Patent Examined Publication No. 31,746/82). However, the resulting rubber composition is not well reinforced and is insufficient resistance to breaking. Moreover, the short fiber is orientated toward the direction in which a shear force has been applied at the time of compounding, and accordingly, the rubber reinforcement becomes anisotropic.

On the contrary, the rubber composition of this invention has overcome the above-mentioned drawbacks of conventional short fiber-reinforced rubbers and has an improved resistance to breaking and fatigue. Further, unexpectedly, the rubber composition of this invention is very well reinforced and quite excellent in extrudability.

In the polymer composition produced according to this invention, a syndiotactic 1,2-PBD is uniformly dispersed in a matrix such as a rubber or the like in the form of fine needles. Therefore, the polymer composition is a composite polymer which has never existed. In this invention, this composite polymer can be used as it is or in admixture with other rubbers.

The needle-like 1,2-PBD in the composite polymer is extremely short and usually has a maximum length of 1 $\mu$m or less, preferably 0.1 $\mu$m or less, more preferably 0.08 $\mu$m or less and an average length of 0.05 $\mu$m or less. The diameter of the needle-like 1,2-PBD is in the range of 0.0001 to 1.0 $\mu$m, preferably 0.001 to 0.5 $\mu$m and its average diameter is at most 0.5 $\mu$m, preferably 0.003 to 0.05 $\mu$m, more preferably 0.005 to 0.03 $\mu$m. The length to diameter ratio, L/D, of the needle-like 1,2-PBD is usually 2 to 100, preferably 5 or more but less than 20.

The amount of the needle-like 1,2-PBD in the composite polymer is preferably 1 to 50% by weight, more preferably 5 to 25% by weight, based on the weight of the composite polymer.

When the amount of the needle-like 1,2-PBD is less than 1% by weight, no reinforcing effect is observed. When the amount exceeds 50% by weight, the composite polymer has a reduced elongation.

In Process (B), by appropriately selecting the type of the polymer constituting the seed polymer particles, the ratio of said polymer to the conjugated diene monomer absorbed in the seed polymer particles or other conditions, the melting point, fine structure, etc. of the resulting polymer can be controlled and thus the modification of the polymer obtained can be easily achieved.

The polymer particles obtained by the present process contains a crystalline polymer having side chains containing a high proportion of vinyl groups, being highly crystalline, having a high melting point and being excellent in mechanical strengths such as impact resistance and the like, solvent resistance, etc. Therefore, the polymer particles can be used in very many applications. The polymer particles can uniformly be dispersed in water and the resulting aqueous dispersion has a good stability. Therefore, the polymer particles are particularly useful in applications where they are used in the form of an aqueous dispersion. That is, the polymer particles are suitably used in applications such as paper-coating compositions, backing materials for carpet, asphalt compositions, foam rubbers, coatings, adhesives, organic fillers for rubber or resin and the like, and the polymer particles are effective for improvement or modification of strengths and heat resistance of various materials used in said applications.

According to this invention, a first catalyst component solution is emulsified and dispersed in water as a dispersing medium or absorbed in seed polymer particles in a seed polymer latex to form droplets of said first catalyst component solution having the desired diameters; thereto are added a conjugated diene monomer and a second catalyst component to allow the monomer and the second catalyst component to be absorbed in the droplets, and the polymerization reaction is carried out; whereby an aqueous dispersion of a crystalline, conjugated diene polymer which is very useful in industry can easily be produced in a high yield as described in Examples in more detail. By controlling the diameters of the droplets of the first catalyst component solution, the diameters of the polymer particles produced can be controlled. As a result, there can be produced easily and in a high yield, polymer particles of a conjugated diene polymer or polymer particles each consisting essentially of said crystalline polymer and other polymer as well as an aqueous dispersion of these polymer particles, all of which are excellent in dispersion stability and have high commercial value.

In Process (B), a first catalyst component solution is formed into an aqueous dispersion and the dispersion is mixed and stirred with an aqueous dispersion of seed polymer particles containing a conjugated diene monomer. As a result, the contact between the first catalyst component solution and the seed polymer particles becomes closer and the first catalyst component solution can effectively be absorbed in the seed polymer particles.

The composite polymer in which a needle-like, syndiotactic 1,2-PBD is dispersed in a rubbery polymer is useful particularly in a tire application and also useful in other applications such as foam rubbers, adhesives for paper-coating pigments, self-adhesives and the like.

In the above applications, the size of the needle-like, syndiotactic 1,2-PBD is not critical. However, the maximum diameter of 0.1 $\mu$m and an average diameter of 0.05 $\mu$m or less are preferable for foam rubbers; and the maximum diameter of 0.08 μm and an average diameter of 0.05 μm or less are preferable for paper-coating and self-adhesives.

Of the polymer particles produced in accordance with Process (B) of this invention, particularly polymer particles having diameters of 0.05 to 1 μm and consisting of (1) 50 to 95% by weight of a polymer or copolymer of at least one monomer selected from the group consisting of conjugated diolefins, aromatic alkenyl compounds, acrylic acid esters, methacrylic acid esters and alkenyl cyanides and (2) 50 to 5% by weight of a crystalline 1,2-PBD containing at least 80% of 1,2-vinyl configuration, can be used in various applications mentioned later and are very useful.

In the process of this invention, the type of polymerization tank used is not critical and there can be used a single polymerization tank, a multi-stage polymerization tank consisting of agitation type polymerization tanks arranged in a series, etc. The use of multi-stage polymerization tanks is preferable because it enables easier control of polymerization conditions and provides polymer particles of uniform quality.

Hereinunder Examples of this invention will be described. However, this invention is not restricted to these Examples. Parts and % shown below are parts by weight and % by weight, respectively.

EXAMPLE 1

Into a 100-ml pressure bottle preliminarily purged with nitrogen was charged 7.5 ml of a 0.2 mole/liter cobalt octylate solution in cyclohexane. Then, a magnetic stirrer was placed therein and the pressure bottle was stoppered. Thereinto was charged 2.6 ml of butadiene. While violently rotating the magnetic stirrer, 9 ml of a 0.5 mole/liter triisobutylaluminum solution in cyclohexane was added thereto at 30° C. The resulting mixture was subjected to reaction for about 15 min. Thereto was added 11 ml of n-hexadecane to obtain a first catalyst component solution. With 10 ml of this first catalyst component solution were mixed 100 ml of a water which had preliminarily been subjected to sufficient bubbling with a nitrogen gas (hereinunder this water is referred to as N$_2$-bubbled water) and 2 g of sodium laurylsulfate. The resulting mixture was exposed to an ultrasonic wave in a nitrogen atmosphere to emulsify and disperse the first catalyst component solution so as to form fine particles of 0.3 to 0.6 μm in diameter. In a 350-ml pressure bottle was placed 22 ml of the resulting emulsion. Thereto were added 80 ml of a N$_2$-bubbled water and 16 ml of butadiene.

To the resulting mixture was added 1 ml of 1 mole/liter carbon disulfide solution in n-hexane, and the resulting mixture was subjected to polymerization for 1 hr at 30° C. In the case of the latex obtained, the polymerization yield was 96%; the solid content was 7.5%; the diameters of the polymer particles were 0.4 to 0.8 μm with an average diameter of 0.6 μm. These measurements were made in accordance with the dynamic light-scattering method using a Model N$_4$ manufactured by Coulter. This latex, when allowed to stand for a long time, caused no separation and was stable. The polymer produced was recovered and dried. Its infrared absorption spectrum was identical with that of 1,2-PBD and the polymer had a 1,2-vinyl configuration content of 97%. The polymer showed a melting point of 200° C. according to a differential scanning calorimeter and a crystallinity of 93% according to X-ray diffraction.

COMPARATIVE EXAMPLE 1

The same procedure as in Example 1 was repeated, except that polymerization was conducted without previously finely dispersing the first catalyst component solution.

That is, in a 350-ml pressure bottle were placed 100 ml of a N$_2$-bubbled water, 0.4 g of sodium laurylsulfate and 16 ml of butadiene, and the resulting mixture was stirred. Thereto was added 2 ml of the same first catalyst component solution as in Example 1. Then, 1 ml of 1 mole/liter carbon disulfide solution in ethyl acetate was added. The whole mixture was subjected to polymerization for 1 hr at 30° C. with rotational stirring.

In the case of the latex obtained, the polymerization yield was 92%, but the polymer particles had diameters of 3 to 5 mm and the latex was quite different from ordinary stable latexes.

COMPARATIVE EXAMPLE 2

Polymerization was conducted in the same manner as in Example 1, except that the same first catalyst component solution as in Example 1 and the second catalyst component were mixed preliminarily and this mixture was dispersed in water by means of an ultrasonic wave so as to form particles of 0.2 to 0.6 μm in diameter. The polymerization was conducted for 10 hr at 30° C. The polymerization yield was 30% and the polymerization activity of the catalyst was very low.

EXAMPLE 2

In a 200-ml pressure bottle preliminarily purged with nitrogen was placed 14.4 ml of a 0.25 mole/liter cobalt naphthenate solution in n-hexane. Then, a magnetic stirrer was placed therein and the pressure bottle was stoppered. Thereto was added 4.5 ml of butadiene and 18 ml of a 0.4 mole/liter n-butyllithium solution in n-hexane was added while violenty rotating the magnetic stirrer, and the resulting mixture was subjected to reaction for about 15 min to obtain a first catalyst component solution. To the whole of this solution were added 500 ml of a N$_2$-bubbled water and 5 g of sodium laurylsulfate. The resulting mixture was treated with a homogenizer (Model 15M manufactured by APV Gaulin Inc.) to emulsify and disperse the first catalyst component solution so as to form particles of 0.1 to 0.3 μm in diameter. The while of the resulting emulsion was placed in a 3-liter autoclave. Thereto were added 1,600 ml of a N$_2$-bubbled water and 640 ml of butadiene. The resulting mixture was stirred for 10 min. Thereto was added, as a second catalyst component, 40 ml of a 1 mole/liter carbon disulfide solution in ethyl acetate and the resulting mixture was subjected to polymerization for 1 hr at 30° C.

In the case of the latex obtained, the polymerization yield was 91%; the solid content was 17.6%; the diameters of the polymer particles were 0.2 to 0.7 μm with an average diameter of 0.4 μm; and the dispersion stability was good. The polymer obtained had a 1,2-vinyl configuration content of 95% and a melting point of 160° C.

COMPARATIVE EXAMPLE 3

Polymerization was conducted in the same manner as in Example 2, except that the same first catalyst component solution as in Example 2 was placed in the same autoclave as in Example 2 together with water, an emulsifier and butadiene with the same formulation as in Example 2, and an emulsion was formed by rotating the paddle type agitator. The polymer particles in the latex obtained had diameters of 0.1 to 1 mm. When the latex was allowed to stand for a while, separation occurred and no good dispersion stability was obtained.

EXAMPLE 3

Polymerization was conducted in the same manner as in Example 2, except that 45 ml of a 0.1 mole/liter sodium boron hydride solution in isopropyl alcohol was added in place of the n-butyllithium solution.

In the latex obtained, the polymerization yield was 91%; the polymer particles had diameters of 0.3 to 0.7 $\mu$m with an average diameter of 0.5 $\mu$m; and the polymer had a melting point of 165° C.

EXAMPLE 4

Polymerization was conducted in the same manner as in Example 3, except that 22.5 ml of a 0.2 mole/liter n-butyllithium solution in n-hexane was used in place of the sodium boron hydride solution.

In the latex obtained, the conversion was 94%; the polymer particles had an average diameter of 0.55 $\mu$m; the polymer had a melting point of 170° C.; and the vinyl group content in the polymer was 94%.

EXAMPLE 5

In a 100-ml pressure bottle preliminarily purged with nitrogen were placed 7.5 ml of a 0.2 mole/liter cobalt octylate solution in n-hexane, and 11 ml of cyclohexane was further placed. Therein was placed a magnetic stirrer, and the pressure bottle was stoppered. Thereinto was charged 2.6 ml (a volume at room temperature (20° C.)) of 1,3-butadiene. While cooling the bottle in an iced water, the magnetic stirrer was rotated violently for 10 min. Then, 9.0 ml of a 0.5 mole/liter triisobutylaluminum solution in n-hexane was fed, and the resulting mixture was subjected to reaction for about 15 min to obtain a first catalyst component solution. To 10 ml of this first catalyst component solution were added 100 ml of N$_2$-bubbled water and 2 g of sodium laurylsulfate. The resulting mixture was exposed to an ultrasonic wave (output: 300 W, frequency: 19 KHz) in a nitrogen gas atmosphere to prepare a dispersion in which the dispersed particles had a diameter of 0.05 to 0.2 $\mu$m. This dispersion is referred to as Catalyst Dispersion 1.

One gram (as solid) of a polybutadiene latex (#0700, manufactured by JAPAN SYNTHETIC RUBBER CO., LTD.), in which the dispersed particles (a seed polymer) had an average diameter of 0.3 $\mu$m, produced by an emulsion polymerization was diluted with distilled water to a volume of 80 ml. The diluted latex was placed in a 300-ml pressure bottle, and nitrogen gas bubbling was conducted. Thereto was added 22 ml of Catalyst Dispersion 1 and the pressure bottle was stoppered. The bottle was shaken violently for about 15 min at room temperature to allow the first catalyst component solution to be absorbed in the seed polymer particles in the latex. The pressure bottle was cooled in iced water, charged with 6.2 g of 1,3-butadiene, and then shaken mildly. Then, 1 ml of a 0.1 mole/liter carbon disulfide solution in methyl acetate, which is a second catalyst component, was charged thereinto and the bottle was shaken for 2 hr at room temperature (20° C). In the resulting latex, no formation of coagulated material was observed. When this latex was allowed to stand for a long time, no separation of dispersed particles was caused and a stable dispersion state was maintained.

EXAMPLE 6

The same procedure as in Example 5 was repeated, except that 3.1 g of 1,3-butadiene was used in place of the 6.2 g of 1,3-butadiene used in the polymerization step of Example 5, to obtain an aqueous dispersion of polymer particles.

EXAMPLE 7

The same procedure as in Example 5 was repeated, except that 1 g (as solid) of a styrene-butadiene copolymer latex [#0599, manufactured by JAPAN SYNTHETIC RUBBER CO., LTD.], in which the dispersed particles (seed polymer) had an average particle diameter of 0.1 $\mu$m, was used in place of the polybutadiene latex (#0700) used in the polymerization step of Example 5, to obtain an aqueous dispersion of polymer particles.

EXAMPLE 8

The same procedure as in Example 5 was repeated, except that 3 g (as solid) of a polystyrene latex (IMMUTEX, manufactured by JAPAN SYNTHETIC RUBBER CO., LTD.), in which the dispersed particles (seed polymer) had an average diameter of 0.7 $\mu$m, produced by a soap-free polymerization was used in place of the polybutadiene latex (#0700) used in the polymerization step of Example 5, to obtain an aqueous dispersion of polymer particles.

EXAMPLE 9

The same procedure as in Example 5 was repeated, except that a cis-1,4-polyisoprene latex (MAXPRENE IR 900, manufactured by SEITETSU KAGAKU CO., LTD.), in which the dispersed particles (seed polymer) had an average diameter of 0.7 $\mu$m, produced by reemulsifying a polymer was used in place of the polybutadiene latex (#0700) used in the polymerization step of Example 5, to obtain an aqueous dispersion of polymer particles.

The polymer particles obtained in Examples 5 to 9 were subjected to evaluation of following items, to obtain the results shown in Table 1:

(1) Conversion of 1,3-butadiene monomer
(2) Component ratio of polymer, namely, weight ratio (a/b) of seed polymer (a) to polymer (b) of conjugated diene monomer absorbed in the seed polymer (a)
(3) Average diameter of polymer particles, as measured in accordance with the dynamic light-scattering method
(4) Melting point of polymer, as measured using a differential scaning calorimeter
(5) Vinyl group content in polymer, as measured in accordance with the Morero analysis method using infrared absorption spectrum.

TABLE 1

|  | Conversion (%) | Component ratio of polymer, a:b | Average particle diameter ($\mu$m) | Melting point (°C.) | Vinyl group content (%) |
| --- | --- | --- | --- | --- | --- |
| Example 5 | 95 | 1:5.9 | 0.57 | 140 | 98 |
| Example 6 | 82 | 1:2.5 | 0.46 | 135 | 95 |
| Example 7 | 96 | 1:6.0 | 0.19 | 150 | 97 |
| Example 8 | 94 | 1:1.9 | 1.0 | 165 | 98 |
| Example 9 | 96 | 1:6.0 | 1.34 | 135 | 96 |

In order to ascertain the structure of the polymer particles of this invention, the section of said particles was observed using a transmission type electron microscope. The test sample was prepared by dyeing the aqueous dispersion (latex) obtained in Example 4 with OsO4, evaporating water in the dispersion to convert the polymer particles to a powder, embedding the powder in a resin, then solidifying them, and cutting the resulting block into slices using an ultra microtome. Then, electron microphotographs showing the section of the polymer particles were taken from the slices.

According to the microphotographs obtained, a crystalline, syndiotactic 1,2-PBD (portions dyed in black) existed in the form of needles in polystyrene particles having a diameter of about 1 μm.

EXAMPLE 10

In a 100-ml pressure bottle preliminarily purged with a nitrogen gas was placed 7.5 ml of a 0.2 mole/liter cobalt octylate solution in n-hexane. Further, a magnetic stirrer was placed therein, and the pressure bottle was stoppered. Thereto was charged 20 ml (a volume at room temperature (20° C.)) of 1,3-butadiene. While rotating the magnetic stirrer violently, the pressure bottle was cooled with ice for 10 min, after which 22.5 ml of 0.2 mole/liter sodium boron hydride solution in isopropanol was added, and the resulting mixture was subjected to reaction for 15 min to obtain a first catalyst component solution. To 10.9 ml of this catalyst component solution were added 100 ml of N2-bubbled water and 2 g of sodium laurylsulfate. The resulting mixture was exposed to an ultrasonic wave (output: 300 W, frequency: 19 KHz) in a nitrogen atmosphere to prepare a dispersion in which the dispersed particles had a diameter of 0.05 to 0.2 μm. This dispersion is referred to as Catalyst Dispersion 2.

One gram (as solid) of the polybutadiene latex (#0700) was diluted with distilled water to a volume of 80 ml, and placed in a 300-ml pressure bottle. The bottle contents were subjected to nitrogen bubbling. Thereto was added 24 ml of Catalyst Dispersion 2, and the pressure bottle was stoppered. The bottle was shaken violently for about 15 min at room temperature to allow the first catalyst component solution to be absorbed in the seed polymer particles in the latex. Thereafter, the bottle was cooled in iced water and into the bottle were charged 6.2 g of 1,3-butadiene and 1 ml of a 0.1 mole/liter carbon disulfide solution in n-hexane as a second catalyst component, in this order. The pressure bottle was shaken for 2 hr at room temperature (20° C.) to effect polymerization. The resulting latex was tested for the various characteristics previously mentioned, which revealed that the polymerization conversion was 92%, the polymer particles had an average diameter of 0.54 μm, the polymer had a melting point of 168° C., the vinyl group content in the polymer was 96%, and the latex had a solid content of 6.4%. In this latex, no formation of coagulated matter was observed, and even when the latex was allowed to stand for a long time, neither agglomeration nor separation of the dispersed particles occurred, and the latex was stable.

EXAMPLE 11

The same procedure as in Example 5 was repeated, except that 6.2 g (as solid) of a natural rubber latex (product in Felda of Malaysia), in which the dispersed particles had an average diameter of 0.4 μm, was used in place of the polybutadiene latex (#0700) used in the polymerization step of Example 5, to obtain an aqueous dispersion of polymer particles.

This aqueous dispersion was subjected to evaluation of the characteristic items previously mentioned to obtain the results shown in Table 2.

TABLE 2

| | Conversion (%) | Component ratio of polymer, a:b | Average particle diameter (μm) | Melting point (°C.) | Vinyl group content (%) |
|---|---|---|---|---|---|
| Example 11 | 95 | 1:0.9 | 0.40 | 160 | 96 |

The polymer of this invention obtained by using a natural rubber latex and/or a diene type rubber latex as a dispersion of a seed polymer had a rubber-like appearance, was excellent in tensile strength and flex strength, and was suitable for use in tire, rubber vibration insulator, etc.

EXAMPLE 12

Into a pressure bottle were charged 15.5 parts (as solid) of a natural rubber latex (product in Felda of Malaysia), in which the dispersed particles had an average diameter of 0.4 μm, and 48 parts of distilled water. The system was subjected to thorough nitrogen bubbling and then cooled at 5° C. Thereto was added 3.1 parts of 1,3-butadiene and they were stirred for 30 min to allow the 1,3-butadiene to be absorbed in the latex particles (seed particles). This dispersion is referred to as Seed Dispersion A.

In a pressure bottle preliminarily purged with a nitrogen gas were placed 0.33 part of a 0.2 mole/liter cobalt octylate solution in n-hexane and 0.56 part of cyclohexane in this order. The resulting mixture was thoroughly stirred. The system was cooled to 5° C., and thereto was added 0.11 part of 1,3-butadiene, after which the system was stirred for 30 min. To the system was added 0.39 part of a 0.5 mole/liter triisobutylaluminum solution in n-hexane, and the system was stirred for 30 min with cooling to obtain a first catalyst component solution.

To this first catalyst component solution were added 0.2 part (as solid) of sodium dodecylbenzenesulfonate and 10 parts of N2-bubbled water. The resulting mixture was subjected to preliminary dispersion by a homomixer in a nitrogen gas atmosphere and then to emulsification and dispersion by a homogenizer (Model 15M manufactured by APV Gaulin Inc.), to prepare an aqueous dispersion in which the dispersed particles had an diameter of 0.1 to 0.3. This dispersion is referred to as First Catalyst Dispersion A.

To the Seed Dispersion A previously prepared was added this First Catalyst Dispersion A. The resulting mixture was stirred for 30 min with keeping the temperature at 5° C. Thereto was added 0.11 part of 0.6 mole/liter carbon disulfide solution in n-hexane (hereinunder this solution is referred to as Second Catalyst Solution A). The resulting mixture was slowly stirred for 3 hr with keeping the temperature at 5° C. to effect polymerization.

In the above polymerization, the polymerization yield was 95% and no formation of coagulat was observed Upon testing, the polymer obtained had a melting point of 200° C. as measured by a differential scanning calorimeter and its vinyl group content was 98% as measured in accordance with the Morero analysis method using infrared absorption spectrum.

EXAMPLE 13

Into a reactor preliminarily purged with a nitrogen gas were charged 70 parts of 1,3-butadiene, 30 parts of styrene, 5.0 parts of potassium stearate, 0.1 part of potassium phosphate, 0.06 part of sodium ethylenediaminetetraacetate, 0.005 part of ferrous sulfate, 0.03 part of sodium formaldehydesulfoxylate, 0.03 part of diisopropylbenzene hydroperoxide, 0.2 part of dodecyl mercaptan and 190 parts of distilled water. The resulting mixture was subjected to polymerization with stirring at 5° C. Since after 15 hr from the start of polymerization, the conversion reached 72%, 0.15 part of N,N-diethylhydroxylamine was added to the polymerization system to terminate the reaction. The resulting dispersion is referred to as Seed Dispersion B.

Thereafter, polymerization was conducted in the same manner as in Example 12, except that the above Seed Dispersion B was used in place of the Seed Dispersion A used in Example 12 and the amounts of the First Catalyst Dispersion A and the Second Catalyst Solution A used were 5 times those respectively used in Example 12. When the polymerization conversion reached 70%, 0.1 part of potassium dimethyldithiocarbamate was added to terminate the reaction. As a result, a latex free of any coagulated matter and having a good dispersion stability was obtained.

Upon testing, the polymer obtained had a melting point of 200° C. as measured by a differential scanning calorimeter and the vinyl group content of the polymer was 95% as measured by the Morero analysis method using infrared absorption spectrum

EXAMPLE 14

Polymerization was conducted in the same manner as in Example 13, using multi-stage polymerization tanks. As a result, as in Example 13, a latex free of any coagulated matter and having a good dispersion stability could be obtained continuously and efficiently.

EXAMPLE 15

In a pressure bottle were placed 124 parts (as solids) of a commercially available, acrylic rubber latex (AE 203, manufactured by JAPAN SYNTHETIC RUBBER CO., LTD.) and 400 parts of distilled water. The system was subjected to sufficient bubbling with nitrogen gas. The system was cooled to 5° C., after which 3.1 parts of 1,3-butadiene was added and the resulting mixture was stirred for 30 min to allow the 1,3-butadiene to be absorbed in the seed particles. This dispersion is referred to as Seed Dispersion C.

In a pressure bottle preliminarily purged with nitrogen was placed 0.39 part of a 0.2 mole/liter cobalt octylate solution in cyclohexane. The system was cooled to 5° C., and thereto was added 0.11 part of 1,3-butadiene, after which the system was stirred for 30 min. Thereto was added 1.2 parts of a 0.2 mole/liter sodium boron hydride solution in isopropanol and, with cooling, the resulting mixture was stirred for 30 min to obtain a first catalyst component solution.

To this first catalyst component solution were added 0.2 part (as solid) of sodium dodecylbenzenesulfonate and 10 parts of N$_2$-bubbled water. The resulting mixture was subjected to preliminary dispersion by a homomixer in a nitrogen atmosphere and then to emulsification and dispersion by a homogenizer (Model 15M manufactured by APV Gaulin Inc.) to prepare an aqueous dispersion. This dispersion is referred to as First Catalyst Dispersion B.

To the Seed Dispersion C previoulsy prepared was added the First Catalyst Dispersion B, and the resulting mixture was stirred for 30 min while keeping the mixture at a temperature of 5° C. Thereto was added 0.11 part of Second Catalyst Solution A (0.6 mole/liter carbon disulfide solution in n-hexane), and the resulting mixture was slowly stirred for 3 hr while keeping the mixture at 5° C. to effect polymerization.

As a result, the polymerization yield was 97%, and a latex having a low coagulated matter content and a good dispersion stability was obtained. Upon testing, the polymer obtained had a melting point of 197° C. as measured by a differential scanning calorimeter, and the vinyl group content was 96% as measured in accordance with the Morero analysis method

EXAMPLE 16

In a pressure bottle preliminarily purged with nitrogen was placed 0.45 part of a 0.2 mole/liter cobaltpyridine complex solution in tetrahydrofuran prepared by reacting cobalt chloride with pyridine at a cobalt chloride/pyridine weight ratio of 1:5.7 in tetrahydrofuran. The system was cooled to 5° C., and 0.11 part of 1,3-butadiene was added, after which the resulting mixture was stirred for 30 min. Thereto was added 0.31 part of 1.5% by weight (0.4 mole/liter) metallic sodium suspension in n-hexane and the resulting mixture was stirred for 30 min with cooling to obtain a first catalyst component solution.

To this first catalyst component solution were added 0.2 part (as solid) of sodium dodecylbenzenesulfonate and 10 parts of N$_2$-bubbled water. The resulting mixture was subjected to preliminary dispersion by a homomixer in a nitrogen atmosphere and then to emulsification and dispersion by a homogenizer to prepare an aqueous dispersion. This dispersion is referred to as First Catalyst Dispersion C.

To the Seed Dispersion A prepared in Example 12 was added the First Catalyst Dispersion C, and the resulting mixture was stirred for 30 min while keeping it at 5° C.

To the system was added 0.11 part of a second catalyst solution A (0.6 mole/liter carbon disulfide solution in n-hexane), and the resulting mixture was slowly stirred for 3 hr while keeping it at 5° C. to effect polymerization.

In this polymerization, the conversion was 70% and no formation of coagulated matter was observed. Upon testing in accordance with the same methods as mentioned above, the polymer had a melting point of 188° C. and the vinyl group content was 93%.

EXAMPLE 17

In a pressure bottle preliminarily purged with nitrogen was placed 0.39 part of a 0.2 mole/liter cobalt naphthenate solution in cyclohexane. The system was cooled to 5° C., and thereto was added 0.11 part of 1,3-butadiene. The resulting mixture was stirred for 30 min. Thereto was added 1.2 parts of 0.2 mole/liter sodium aluminum hydride solution in tetrahydrofuran. The resulting mixture was stirred for 30 min with cooling to obtain a first catalyst component solution.

Polymerization was conducted in the same manner as in Example 15, except that the above solution was used as the first catalyst component solution and 0.11 part of 0.6 mole/liter dimethylxanthogen disulfide solution in n-hexane was used as the second catalyst component.

In the above polymerization reaction, the polymerization yield was 20% and the latex obtained had a low coagulated matter content and a good dispersion stability. Upon testing in accordance with the same methods as mentioned previously, the polymer had a melting point of 160° C. and the vinyl group content was 88%.

EXAMPLE 18

In a 100-ml pressure bottle preliminarily purged with nitrogen were placed 7.5 ml of 0.2 mole/liter cobalt octylate solution in n-hexane and 11 ml of cyclohexane in this order. Then, a magnetic stirrer was placed therein, and the pressure bottle was stoppered. Thereto was fed 2.6 ml (a volume at room temperature (20° C.)) of 1,3-butadiene, after which the magnetic stirrer was rotated violently for 10 min while cooling the pressure bottle with ice. Thereto was added 9.0 ml of a 0.5 mole/liter triisobutylaluminum solution in n-hexane and the resulting mixture was subjected to reaction for about 15 min to obtain a first catalyst component solution.

To 10 ml of the first catalyst component solution taken separately were added 6.2 g of butyl acrylate and 0.02 g of azobisisobutyronitrile. The resulting mixture was added to 100 ml of a $N_2$-bubbled water together with 3.6 g of sodium laurylsulfate. The resulting mixture was treated with an ultrasonic wave homogenizer (output: 300 W, frequency: 19 KHz) in a nitrogen gas atmosphere to prepare an aqueous dispersion in which the dispersed particles had a diameter of 0.05 to 0.2 $\mu$m. This dispersion is referred to as Dispersion 1.

In a 300-ml pressure bottle was placed 80 ml of $N_2$-bubbled water, and the bottle was stoppered. Thereto was added 23.6 ml of the Dispersion 1, and the pressure bottle was cooled for 10 min in iced water. Thereto was fed 6.2 g of 1,3-butadiene, and the bottle was shaken mildly by hand. Thereafter, 1 ml of a 0.1 mole/liter carbon disulfide solution in n-hexane was added as the second catalyst component, and the bottle was shaken for 2 hr at room temperature (20° C.). Subsequently, the bottle was shaken for 5 hr in a constant temperature water bath controlled at 75° C. to obtain an aqueous dispersion of a graft copolymer.

EXAMPLE 19

In a 100-ml pressure bottle preliminarily purged with nitrogen was placed 7.5 ml of a 0.2 mole/liter cobalt octylate solution in n-hexane. Then, a magnetic stirrer was placed and the pressure bottle was stoppered. Thereto was fed 2.6 ml (a volume at room temperature (20° C.)) of 1,3-butadiene, after which the magnetic stirrer was rotated violently for 10 min while cooling the pressure bottle with ice. Thereto was added 22.5 ml of a 1.0 mole/liter sodium boron hydride solution in isopropanol, and the resulting mixture was subjected to reaction for about 15 min to obtain a first catalyst component solution. With 10.9 ml of this first catalyst component solution were mixed 31 g of butyl acrylate and 0.1 g of azobisisobutyronitrile. This mixture was added to 100 ml of $N_2$-bubbled water together with 8.0 g of sodium laurylsulfate. The resulting mixture was treated with an ultrasonic wave homogenizer in a nitrogen atmosphere to prepare an aqueous dispersion in which the dispersed particles had a diameter of 0.05 to 0.2 $\mu$m. This dispersion is referred to as Dispersion 2.

In a 300-ml pressure bottle was placed 80 ml of $N_2$-bubbled water and the bottle was stoppered. Thereto was fed 30 ml of the Dispersion 2. The pressure bottle was cooled for 10 min in iced water, and thereto was added 6.2 g of 1,3-butadiene, after which the bottle was shaken mildly by hand. Then, 1 ml of a 0.1 mole/liter carbon disulfide solution in n-hexane was fed, and the pressure bottle was shaken for 2 hr at room temperature (20° C.). Subsequently, the bottle was shaken for 5 hr in a constant temperature water bath controlled at 75° C. to obtain an aqueous dispersion of a graft copolymer.

EXAMPLE 20

A first catalyst component solution was prepared in the same manner as in Example 19.

To 100 ml of $N_2$-bubbled water was added 10.9 ml of this first catalyst component solution together with 2.0 g of sodium laurylsulfate. The resulting mixture was treated with an ultrasonic wave homogenizer to prepare an aqueous dispersion in which the dispersed particles had a diameter of 0.05 to 0.2 $\mu$m. This dispersion is referred to as Dispersion 3.

In a 300-ml pressure bottle was placed 80 ml of $N_2$-bubbled water, and the bottle was stoppered. Thereto was fed 22 ml of the Dispersion 3, and the pressure bottle was cooled in iced water for 10 min. Thereto was fed 6.2 g of 1,3-butadiene, and the pressure bottle was shaken mildly by hand. Thereafter, 1 ml of a 0.1 ml/liter carbon disulfide solution in n-hexane was fed as the second catalyst component, and the pressure bottle was shaken for 2 hr at 20° C. to conduct a first step polymerization.

To 40 ml of distilled water were added 40 g of 2-ethylhexyl acrylate, 5 g of n-hexane and 0.2 g of benzoyl peroxide together with 2.0 g of sodium laurylsulfate. The resulting mixture was treated with ice-cooling by means of an ultrasonic wave homogenizer to prepare an aqueous dispersion in which the dispersed particles had a diameter of 0.05 to 0.2 $\mu$m. This dispersion is referred to as Dispersion 4. 13 g of Dispersion 4 was taken and fed to the pressure bottle containing the dispersion obtained in the first step polymerization. The bottle was shaken for 1 hr at room temperature, after which it was placed in a constant temperature water bath controlled at 75° C. and shaken for 5 hr to conduct a second step polymerization, thereby obtaining an aqueous dispersion of a graft copolymer.

EXAMPLE 21

A first step polymerization was conducted in the same manner as in Example 20. Then, to the pressure bottle were fed 0.3 g of methacrylic acid and 1 ml of 0.1% aqueous sodium persulfate solution. The bottle was shaken for 5 hr in a constant temperature water bath controlled at 75° C. to effect a second step polymerization, thereby obtaining an aqueous dispersion of a graft copolymer.

With respect to the graft copolymer obtained, a conductometric titration was conducted to reveal that 70% of the methacrylic acid added had been polymerized on the surfaces of the particles.

EXAMPLE 22

In a 500-ml pressure bottle preliminarily purged with nitrogen were placed 75 ml of a 0.2 mole/liter cobalt octylate solution in n-hexane and 110 ml of cyclohexane in this order. Further, a magnetic stirrer was placed and the bottle was stoppered. Thereto was fed 26 ml (a volume at room temperature (20° C.)) of 1,3-butadiene, after which the magnetic stirrer was rotated violently for 20 min while cooling the bottle with ice. Thereto was fed 60 ml of a 0.5 mole/liter butyllithium solution in n-hexane and the resulting mixture was subjected to reaction for about 30 min to obtain a first catalyst component solution.

To this first catalyst component solution were added 37.2 g of methyl methacrylate, 37.2 g of butyl acrylate and 0.12 g of azobisisobutyronitrile. This mixture was added to 600 ml of N₂-bubbled water containing 26 g of sodium laurylsulfate. The resulting mixture was subjected to preliminary dispersion by means of a homomixer in a nitrogen atmosphere and then to emulsification and dispersion by means of a homogenizer (Model 15M manufactured by APV Gaulin Inc.) to prepare an aqueous dispersion in which the dispersed particles had a diameter of 0.05 to 0.1 μm. This dispersion is referred to as Dispersion 5.

In a 5-liter pressure bottle as placed 2.4 liters of N₂-bubbled water Thereto was added the Dispersion 5. To the resulting mixture was added 186 g of 1,3-butadiene while controlling the temperature of the mixture at 5° C., and the resulting mixture was stirred violently for 15 min. Thereto was added, as a second catalyst component, 5 ml of a 0.6 mole/liter carbon disulfide solution in methyl acetate. The resulting mixture was slowly stirred for 2 hr while keeping the temperature at 15° C. to effect polymerization.

Then, the mixture was subjected to reaction for 5 hr with slow stirring while keeping the temperature at 75° C. to obtain an aqueous dispersion of a graft copolymer.

EXAMPLE 23

A first catalyst component solution was prepared in the same manner as in Example 22. This solution and 12 g of sodium laurylsulfate were added to 600 ml of N₂-bubbled water. The resulting mixture was subjected to preliminary dispersion by means of a homomixer in a nitrogen atmosphere and then to emulsification and dispersion by means of a homogenizer to prepare an aqueous dispersion in which the dispersed particles had a diameter of 0.05 to 0.1 μm. This dispersion is referred to as Dispersion 6.

186 g (as solid) of a commercially available styrene-butadiene copolymer latex (#0599, manufactured by JAPAN SYNTHETIC RUBBER CO., LTD.), in which the dispersed particles had an average diameter of 0.1 μm, produced by an emulsion polymerization was diluted with distilled water to a volume of 2.4 liters. The diluted latex was placed in a 5-liter pressure bottle and subjected to nitrogen bubbling for 30 min. Thereto was fed to the Dispersion 6, and the resulting mixture was stirred violently while controlling the bottle temperature at 5° C. Thereafter, 186 g of 1,3-butadiene was fed, and the resulting mixture was stirred violently for 15 min, after which 5 ml of 0.6 mole/liter carbon disulfide solution in n-hexane was fed. The resulting mixture was slowly stirred for 2 hr with controlling the temperature at 15° C. to conduct polymerization.

To the pressure bottle was fed 10 ml of a 5% aqueous sodium persulfate solution, and the temperature of the resulting mixture was elevated. When the temperature reached 75° C., to the system was slowly added over 3 hr an emulsion obtained by emulsifying 66 g of styrene, 37 g of methyl methacrylate, 74 g of 2-ethylhexyl acrylate and 9 g of methacrylic acid in 190 g of distilled water by the use of 0.5 g of sodium dodecylbenzenesulfonate and 0.5 g of a nonionic soap (EM-931, a trade name of Kao Corp. for ethoxylated nonyl phenol obtained by ethoxylating 1 mole of nonyl phenol with 28 moles of ethylene oxide) to effect polymerization.

The aqueous polymer dispersions and the polymers obtarned in Examples 18 to 20 and Examples 22 and 23 were subjected to evaluation of the following items:
(1) Polymerization yield
(2) Solid content in aqueous dispersion
(3) Average diameter of polymer particles, as measured in accordance with the dynamic light-scattering method
(4) Melting point of polymer, as measured by a differential scanning calorimeter
(5) Vinyl group content in polymer, as measured in accordance with the Morero analysis method using infrared absorption spectrum
(6) Grafting degree, as measured by the following method in Example 18 (substantially the same methods were used in other Examples).
 (a) A polymer was recovered from its aqueous dispersion and dried. 10 g of the polymer obtained was sampled.
 (b) The amount of butyl acrylate component polymerization in 10 g of the polymer was calculated from the composition of the components charged and the polymerization conversion, and is designated as $W_1$.
 (c) 10 g of the polymer was subjected to Soxhlet extraction using tetrahydrofuran as a solvent. The amount of the butyl acrylate polymer extracted was determined and is designated as $W_2$.
 (d) The amount ($W_3$) of the butyl acrylate polymer component grafted on the polymer was calculated from the following equation:

$$W_3 = W_1 - W_2$$

(e) Grafting degree = $(W_3/W_1) \times 100$

A larger grafting degree implies that a larger amount of monomers are grafted on a conjugated diene polymer.

The results are shown in Table 3.

TABLE 3

|  | Polymerization yield (%) | Solid content (%) | Average particle diameter (μm) | Melting point (°C.) | Vinyl group content (%) | Grafting degree (%) |
|---|---|---|---|---|---|---|
| Example 18 | 85 | 6.4 | 0.4 | 210 | 93 | 32 |
| Example 19 | 80 | 10.0 | 0.5 | 130 | 90 | 25 |
| Example 20 | 93 | 9.9 | 0.5 | 140 | 98 | 23 |
| Example 22 | 83 | 7.0 | 0.4 | 150 | 91 | 30 |
| Example 23 | 93 | 13.8 | 0.14 | 180 | 95 | 22 |

EXAMPLE 24

Sample I

Polymerization was conducted in the same manner as in Example 12, except that the amount of 1,3-butadiene absorbed in the Seed Dispersion A was 4.7 parts (Seed Dispersion I), and a first catalyst component solution was prepared using 0.50 part of 0.2 mole/liter cobalt octylate solution in n-hexane, 0.84 part of cyclohexane, 0.17 part of 1,3-butadiene and 0.59 part of 0.5 mole/liter triisobutylaluminum solution in n-hexane. Steam was blown directly into the resulting Latex I to strip the unreacted monomer. Then, 0.5 part of an anti-aging agent A (Wingstay 200, manufactured by Good Year) was added, and the resulting mixture was thoroughly stirred. Thereafter, the mixture was coagulated according to an ordinary method and dried by allowing it to stand in a hot air drier at 100° C. for 2 hr to obtain a needle-like 1,2-PBD-reinforced natural rubber I.

Sample II

Seed Dispersion II was obtained by repeating the same procedure as used for the preparation of the Seed Dispersion I in Sample I, except that in place of absorbing 4.7 parts of 1,3-butadiene in Seed Dispersion A, 2.3 parts of 1,3-butadiene was absorbed in the Seed Dispersion A.

Then, polymerization was conducted in the same manner as in Sample I, except that the Seed Dispersion II was used in place of the Seed Dispersion I and the amounts of the first catalyst dispersion A and the second catalyst solution A were $\frac{1}{2}$ of those used in Sample I, whereby Latex II was obtained in a polymerization yield of 97%. This latex was coagulated and dried in the same manner as in Sample I, except that the Latex II was used in place of the Latex I and the amount of the anti-aging agent used was changed from the 0.5 part to 0.45 part, to obtain a needle-like 1,2-PBD-reinforced natural rubber II.

Sample III

Seed Dispersion III was obtained by repeating the same procedure as used for the preparation of the Seed Dispersion I in Sample I, except that 1.3 parts of 1,3-butadiene was substituted for the 4.7 parts of 1,3-butadiene.

Then, polymerization was conducted in the same manner as in Sample I, except that the Seed Dispersion III was used in place of the Seed Dispersion I and the amounts of the first catalyst dispersion A and the second catalyst solution A used were 0.27 times those used in Sample I, whereby Latex III was obtained in a polymerization yield of 95%.

This latex was coagulated and dried in the same manner as in Sample I, except that the Latex III was used in place of the Latex I and 0.42 part of the anti-aging agent was substituted for the 0.5 part of the anti-aging agent, to obtain a needle-like 1,2-PBD-reinforced natural rubber III.

Sample IV 15.5 parts (as solid) of a styrene-butadiene rubber latex (#1500, manufactured by JAPAN SYNTHETIC RUBBER CO., LTD.) was taken out of the last reactor of multi-stage polymerization reactors and placed in another pressure reactor preliminarily purged with nitrogen. Thereto was added 0.02 part of N,N-diethylhydroxylamine to terminate the reaction. Analysis by a gas chromatography revealed that this latex contained, as unreacted monomer, 4.7 parts of 1,3-butadiene. This is designated as Seed Dispersion IV.

Polymerization was conducted in the same manner as in Sample I, except that the Seed Dispersion IV was substituted for the Seed Dispersion I, whereby Latex IV was obtained in a polymerization yield of 97%. This latex was coagulated and dried in the same manner as in Sample I, except that the Latex IV was substituted for the Latex I and, the 0.5 part of the anti-aging agent A was replaced by 0.5 part of an anti-aging agent B [an aqueous dispersion of a solution of 2,2'-dihydroxy-3,3'-di(α-methylcyclohexyl)-5,5'-dimethyldiphenylmethane (concentration: 40%)], to obtain a needle-like 1,2-PBD-reinforced synthetic rubber IV.

Sample V

Polymerization was conducted in the same manner as in Sample I, except that the Seed Dispersion IV was substituted for the Seed Dispersion I and the amounts of the first catalyst dispersion A and the second catalyst solution A used were $\frac{1}{2}$ of those used in Sample I, whereby Latex V was obtained in a polymerization yield of 49%.

Latex V was coagulated and dried in the same manner as in Sample I, except that the Latex V was substituted for the Latex I and 0.45 parts of the anti-aging agent A was substituted for the 0.5 part of the anti-aging agent A, to obtain a needle-like 1,2-PBD-reinforced synthetic rubber V.

Sample VI

Polymerization was conducted in the same manner as in Sample I, except that the Seed Dispersion IV was substituted for the Seed Dispersion I and the amounts of the first catalyst dispersion A and the second catalyst solution A used were 0.27 times those used in Sample I, whereby Latex VI was obtained in a polymerization yield of 26%.

This latex was coagulated and dried in the same manner as in Sample I, except that the Latex VI was substituted for the Latex I and the amount of the anti-aging agent A used was changed from the 0.5 part to 0.42 part, to obtain a needle-like 1,2-PBD-reinforced synthetic rubber VI.

Sample VII

In accordance with the method described in Japanese Patent Examined Publication No. 31,746/82, to 100 parts of a natural rubber was added 15 parts of syn-1,2-polybutadiene particles (melting point: 200° C.) having diameters of 10 to 700 μm, and they were kneaded at 180° C., after which the resulting mixture was extruded from a circular die having an inside diameter of 1 mm and a length-to-inside diameter ratio of 20 at 210° C. and cooled to room temperature, whereby a short fiber 1,2-PBD-incorporated natural rubber VII was obtained.

For the Samples I to VII, there were measured (1) melting point using a differential scanning calorimeter, (2) vinyl group content in accordance with the Morero analysis method using infrared absorption spectrum and (3) diameter of very fine fibers by dyeing the thin cut slice of a polymer with $OsO_4$ and observing the dyed slice using a transmission type electron microscope. The results are shown in Table 4. Observation through the microscope revealed that the needle-like 1,2-PBD was uniformly dispersed in the matrix natural rubber with no anisotropy.

Various rubber compositions as shown in Table 5 were prepared and evaluated for various test items. Incidentally, the carbon black used was N-330 (HAF manufactured by TOKAI CARBON CO., LTD.) and the silica used was Nipsil VN-3 (manufactured by NIPPON SILICA INDUSTRIAL CO.).

(1) Tensile strength, elongation and 300% modulus

Measured in accordance with JIS K 6301.

(2) Flex resistance

A rubber composition was vulcanized and tested using a de Mattia machine (300 cycles per min). The flex resistance of the rubber composition was expressed by the number of flexings until cracks appeared. However, the value in Table 5 is expressed as a flex resistance index obtained by multiplying the number of flexings by a certain coefficient to convert to an appropriate value. A larger value implies better flex resistance.

(3) Fatigue resistance

A dumbbell-shaped No. 3 punched sample described in JIS K 6301 was subjected to 150% elongation stress at 300 cycles per min and a time required until the sample was cut was obtained. An index obtained by multiplying the time by an appropriate coefficient is expressed as the fatigue resistance of the sample.

(4) Creep

A load was applied at 100° C. to a ring-shaped No. 5 punched sample described in JIS K 6301 so that the sample showed a 100% elongation and a time required until the sample had been elongated to 150% was measured. An index obtained by multiplying the time by an appropriate coefficient is expressed as the creep of the sample.

(5) Extrudability

Extrusion was conducted in accordance with ASTM D 2230 (Garvey die, screw diameter 10 mm, L/D=8, die temperature 100° C., 20 rpm). Evaluation was made on the basis of 16 point full mark.

(6) Specific gravity

Obtained from the weights of a cut sample specimen at 20° C. in air and water.

(7) Goodrich heat generation

A load of 143 lb/in$^2$ was applied to a sample using a Goodrich flexometer. A heat generated under the conditions of 0.175 in/stroke, 1,800 rpm and 20 min was measured.

(8) Blackness

In accordance with Color Harmony Manual, the blackness of a sample was rated in 8 levels.

As is obvious from Table 5, the rubber compositions of this invention are sufficiently reinforced without use of carbon black or silica, small in specific gravity and low in Goodrich heat generation, and accordingly can suitably be used in rubber products, particularly energy-saving tire.

As is also obvious from Table 5, the rubber compositions of this invention have quite excellent physical properties as compared with ordinary light-colored rubber compositions and can be used in applications requiring a strength, as a light-colored rubber composition.

As stated above, the rubber compositions of this invention are more strongly reinforced as compared with conventional, short fiber-reinforced rubber compositions and further quite excellent in failure characteristics, fatigue characteristics and processability.

TABLE 4

| Sample | 1,2-PBD content in rubber (wt. %) | Melting point (°C.) | Vinyl group content in 1,2-PBD (%) | Maximum diameter of needle-like 1,2-PBD (μm) | Average diameter of needle-like 1,2-PBD (μm) |
| --- | --- | --- | --- | --- | --- |
| Needle-like 1,2-PBD reinforced natural rubber I | 23.1 | 200 | 98 | 0.05 | 0.018 |
| Needle-like 1,2-PBD reinforced natural rubber II | 12.3 | 198 | 97 | 0.04 | 0.016 |
| Needle-like 1,2-PBD reinforced natural rubber III | 7.4 | 197 | 97 | 0.04 | 0.010 |
| Needle-like 1,2-PBD reinforced synthetic rubber IV | 22.5 | 199 | 98 | 0.05 | 0.017 |
| Needle-like 1,2-PBD reinforced synthetic rubber V | 13.0 | 198 | 96 | 0.03 | 0.015 |
| Needle-like 1,2-PBD reinforced synthetic rubber VI | 7.4 | 197 | 97 | 0.06 | 0.010 |
| Short fiber 1,2-PBD incorporated natural rubber VII | 13 | 200 | 98 | 3.2 | 0.2 |

TABLE 5

| Composition | Ex. 1 | Ex. 2 | Ex. 3 | Ex. 4 | Ex. 5 | Comp. Ex. 1 | Comp. Ex. 2 | Ex. 6 | Ex. 7 | Ex. 8 | Ex. 9 | Ex. 10 | Ex. 11 | Comp. Ex. 3 | Comp. Ex. 4 | Comp. Ex. 5 |
| --- | --- | --- | --- | --- | --- | --- | --- | --- | --- | --- | --- | --- | --- | --- | --- | --- |
| Kind of rubber | | | | | | | | | | | | | | | | |
| Needle-like 1,2-PBD reinforced natural rubber I | 100 | | | | | | | 30 | | | | | 50 | | | |
| Needle-like 1,2-PBD reinforced natural rubber II | | 100 | 100 | | | | | | | | | | | | | |
| Needle-like 1,2-PBD reinforced natural rubber III | | | | 100 | 100 | | | | | | | | | | | |
| Natural rubber | | | | | | 100 | 100 | | | | | | | 50 | 30 | |
| Needle-like 1,2-PBD reinforced synthetic rubber IV | | | | | | | | 70 | | | | | | | | |
| Needle-like 1,2-PBD reinforced synthetic rubber V | | | | | | | | | 100 | 100 | | | | | | |
| Needle-like 1,2-PBD reinforced synthetic rubber VI | | | | | | | | | | | 100 | 100 | | | | |
| Short fiber 1,2-PBD incorporated natural rubber VII | | | | | | | | | | | | | | | | 100 |
| Synthetic rubber | | | | | | | | | | | | | | 70 | 100 | |

TABLE 5-continued

| Composition | Ex. 1 | Ex. 2 | Ex. 3 | Ex. 4 | Ex. 5 | Comp. Ex. 1 | Comp. Ex. 2 | Ex. 6 | Ex. 7 | Ex. 8 | Ex. 9 | Ex. 10 | Ex. 11 | Comp. Ex. 3 | Comp. Ex. 4 | Comp. Ex. 5 |
|---|---|---|---|---|---|---|---|---|---|---|---|---|---|---|---|---|
| (#1500) | | | | | | | | | | | | | | | | |
| Filler | | | | | | | | | | | | | | | | |
| Carbon black N-330 | | | | 30 | | 40 | | | | 10 | | | | 40 | | |
| Silica (Nippseal VN-3) | | 20 | | | | | 40 | | | | | 30 | | | 40 | |
| Softener | | | | | | | | | | | | | | | | |
| Stearic acid | 2 | 2 | 2 | 2 | 2 | 2 | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 | 3 | 3 | 3 | 3 | 3 | 3 |
| N—oxydiethylene-2-benzothiazyl-sulfinamide | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Sulfur | 2 | 2 | 2 | 2 | 2 | 2 | 2 | 2 | 2 | 2 | 2 | 2 | 2 | 2 | 2 | 2 |
| Results | | | | | | | | | | | | | | | | |
| Tensile strength (kg/cm$^2$) | 305 | 308 | 330 | 290 | 360 | 310 | 205 | 283 | 280 | 290 | 260 | 290 | 300 | 285 | 190 | 215 |
| Elongation (%) | 500 | 580 | 480 | 650 | 390 | 400 | 530 | 600 | 620 | 600 | 640 | 570 | 600 | 500 | 750 | 550 |
| 300% modulus (kg/cm$^2$) | 180 | 170 | 190 | 160 | 230 | 200 | 47 | 150 | 130 | 130 | 110 | 145 | 165 | 150 | 20 | 50 |
| Flex resistance index | 100 | 95 | 106 | 90 | 120 | 98 | 80 | 90 | 87 | 89 | 85 | 89 | 93 | 80 | 70 | 83 |
| Fatigue resistance index | 100 | 98 | 107 | 88 | 110 | 105 | 70 | 83 | 78 | 82 | 76 | 85 | 97 | 70 | 60 | 78 |
| Creep index | 100 | 93 | 108 | 96 | 130 | 103 | 60 | 75 | 73 | 75 | 68 | 77 | 95 | 60 | 50 | 65 |
| Extrudability index | 16 | 16 | 16 | 16 | 16 | 10 | 11 | 16 | 16 | 16 | 16 | 16 | 15 | 11 | 10 | 12 |
| Specific gravity | 0.95 | 0.95 | 1.06 | 0.95 | 1.06 | 1.10 | 1.17 | 0.96 | 0.98 | 1.01 | 0.97 | 1.13 | 0.95 | 1.12 | 1.18 | 0.95 |
| Goodrich heat generation ($\Delta$T° C.) | 12 | 10 | 14 | 9 | 20 | 25 | 28 | 18 | 20 | 28 | 17 | 35 | 10 | 43 | 48 | 15 |
| Blackness index | 5 | 5 | 4 | 5 | 8 | 8 | 3 | 4 | 1 | 8 | 1 | 1 | 5 | 8 | 1 | 5 |

EXAMPLES 25 AND 26

The same procedure as in Example 1 was repeated, except that a 1 mole/liter carbon disulfide solution in n-hexane and a 1 mole/liter carbon tetrachloride solution in n-hexane were substituted in the proportion shown in Table 6 for the 1 ml of a 1 mole/liter carbon disulfide solution in n-hexane to conduct the polymerization. The polymerization conversion and the melting point of polymer were measured to obtain the results shown in Table 6.

TABLE 6

| Example No. | Amount of 1 mole/liter carbon disulfide solution added (ml) | Amount of 1 mole/liter carbon tetrachloride solution added (ml) | Polymerization conversion (%) | Melting point (°C.) |
|---|---|---|---|---|
| 25 | 1 | 1 | 95 | 170 |
| 26 | 1 | 5 | 93 | 155 |

What is claimed is:

1. A process for producing composite polymer particles, comprising adding, to an aqueous dispersion of a first catalyst component solution, a conjugated diene monomer and second catalyst component in the presence of seed polymer particles and polymerizing said monomer, said first catalyst component containing (A) a cobalt compound, (B) at least one member selected from the group consisting of alkali metals, organometallic compounds of metals of Groups I to III of the Periodic Table, and hydrides of metals of Groups I to III of the Periodic Table and (C) 1 to 1,000 moles, per mole of the cobalt compound (A), of a conjugated diene monomer and is dispersed in the form of droplets having an average diameter of 10 μm or less and that the second catalyst component is at least one compound selected from the group consisting of carbon disulfide, phenylisothiocyanic acid and a xanthogen compound.

2. The process for producing polymer particles according to claim 1, wherein the aqueous dispersion of the first catalyst component solution is an aqueous emulsion containing an emulsifier.

3. The process for producing polymer particles according to claim 1, wherein the aqueous dispersion of the first catalyst component solution is a dispersion in which seed polymer particles having absorbed therein the first catalyst component solution are dispersed in an aqueous medium.

4. The process for producing polymer particles according to claim 1, wherein an aqueous dispersion of seed polymer particles containing a diene monomer is added to an aqueous dispersion of a first catalyst component solution and a second catalyst component is then added thereto.

5. The process for producing polymer particles according to claim 4, wherein the droplets of the first catalyst component solution dispersed in the aqueous dispersion have an average particle diameter equal to or smaller than that of the seed polymer particles.

6. The process for producing polymer particles according to claim 4, wherein the aqueous dispersion of seed polymer particles containing a diene monomer is formed by subjecting a monomer composition containing said diene monomer to emulsion polymerization so that a part of the diene monomer remains unreacted even after the polymerization.

7. The process according to claim 1, wherein the cobalt compound (A) is cobalt octylate, cobalt naphthenate, cobalt benzoate, cobalt succinate, cobalt malonate, cobalt acetate, cobalt bisacetylacetonate, cobalt trisacetylacetonate, cobalt ethylacetoacetate, triphenylphosphine derivative of cobalt bromide, tri-m-tolylphosphine complex of cobalt bromide, tri-m-xylylphosphine complex of cobalt bromide, pyridine complex of cobalt chloride, β-picoline complex of cobalt chloride, ethyl alcohol complex of cobalt chloride, (1,3-butadiene)[1-(2-methyl-3-butenyl)-π-allyl]-cobalt, tris-π-allylcobalt, bicyclo-[3,3,0]-octyldienyl-1,5-cyclooctadienecobalt, bis-(π-allyl)-halogenocobalt, octacarbonyldicobalt or a mixture of at least two of them.

8. The process according to claim 1, wherein the alkali metal as component (B) is lithium, sodium, potassium, rubidium or cesium.

9. The process according to claim 1, wherein the organometallic compound or hydride of a metal of Groups I to III of the Periodic Table as component (B) is a $C_{1-6}$alkylated product or a hydride of Li, Na, K, Mg, Zn or Al.

10. The process according to claim 9, wherein the alkylated product or hydride is ethyllithium, n-butyllithium, sec-butyllithium, t-butyllithium, diethylzinc, dimethylzinc, butylmagnesium chloride, ethylmagnesium bromide, dibutylmagnesium, dihexylmagnesium, trimethylaluminum, triethylaluminum, triisobutylaluminum, tri-n-hexylaluminum, tridodecylaluminum, diethylaluminum chloride, diisobutylaluminum chloride, ethylaluminum sesquichloride, ethylaluminum dichloride, tetraethylaluminoxane, lithium aluminum hydride, sodium boron hydride, lithium boron hydride or a mixture of two or more of them.

11. The process according to claim 1, wherein the amount of the component (B) is 0.3 to 100 moles per mole of component (A).

12. The process according to claim 1, wherein the xanthogen compound is a compound having a group represented by the formula:

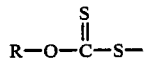

wherein R is an alkyl group.

13. The process according to claim 1, wherein the xanthogen compound is selected from the group consisting of methylxanthogenic acid, ethylxanthogenic acid, n-propylxanthogenic acid, isopropylxanthogenic acid, n-butylxanthogenic acid, sec-butylxanthogenic acid, t-butylxanthogenic acid, n-pentylxanthogenic acid, n-hexylxanthogenic acid, n-heptylxanthogenic acid, n-octylxyanthogenic acid, 2-ethylhexylxanthogenic acid, phenylxanthogenic acid, p-tolylxanthogenic acid, lithium, sodium and potassium salts of these xanthogenic acids, dimethylxanthogen disulfide, diethylxanthogen disulfide, di-n-propylxanthogen disulfide, diisopropylxanthogen disulfide, di-n-butylxanthogen disulfide, di-t-butylxanthogen disulfide, 2-ethylhexylxanthogen disulfide, diphenylxanthogen disulfide and ethylphenylxanthogen disulfide.

14. The process according to claim 1, wherein the amount of the second catalyst component is 0.01 to 100 moles per mole of the cobalt compound (A) of the first catalyst component solution.

15. The process according to claim 1, wherein the conjugated diene monomer is butadiene or isoprene.

16. The process according to claim 1, wherein the conjugated diene monomer is 1,3-butadiene.

17. The process according to claim 1, wherein the fine droplets dispersed in the aqueous dispersion of a first catalyst component solution have diameters of 5 μm or less.

18. The process according to claim 1, wherein the fine droplets dispersed in the aqueous dispersion of a first catalyst component solution have diameters of 1 μm or less.

19. The process according to claim 3, wherein the emulsifier is sodium dodecylbenzenesulfonate, sodium laurylsulfate, a sodium dialkylsulfosuccinate, a naphthalenesulfonic acid-formalin condensate, or a mixtures thereof and a polyoxyethylene nonylphenyl ether, a polyethylene glycol monostearate, sorbitan monostearate, a resin soap or a fatty soap.

20. The process according to claim 3, wherein the aqueous dispersion of seed polymer particles is an emulsion of particles of 0.05 to 6 μm in diameter or a suspension of particles of 1 to 100 μm in diameter.

21. The process according to claim 20, wherein the seed polymer particles are particles of a polystyrene, a polybutadiene, a styrene-butadiene copolymer, an acrylonitrile-butadiene copolymer, an acrylic ester copolymer, a methacrylic ester copolymer, a polyisoprene, a butadiene-isoprene copolymer or a polychloroprene.

22. The process according to claim 1, wherein the seed polymer particles are in the form of a latex in which the seed polymer particles are dispersed in water.

23. The process according to claim 1, wherein the conjugated diene polymer obtained by polymerizing the conjugated diene monomer is a 1,2-polybutadiene having a bound 1,2-configuration content of 70% or more as the bound structure of a conjugated diene and a melting point of at least 70° C.

24. A method of preparing an aqueous latex of composite polymer particles, comprising:
preparing a first catalyst component solution as an aqueous dispersion which contains (A) a cobalt compound, (B) at least one member selected from the group consisting of alkali metals, organometallic compounds of metals of groups I to III of the Periodic Table, and hydrides of metals of groups I to III of the Periodic Table, (C) 1 to 1,000 moles per mole of the cobalt compund (A), of a conjugated diene monomer, and (D) an emulsifier, said first catalyst component solution being dispersed in the form of droplets having an average diameter of 10 μm or less; and
polymerizing conjugated diene monomer in the presence of seed polymer particles as conjugated diene monomer and a second catalyst component are added to said dispersion, said second catalyst component being at least one compound selected from the group consisting of carbon disulfide, phenylisothiocyanic acid and a xanthogen compound.

* * * * *